UNITED STATES PATENT OFFICE.

HENRY ROSELIUS, OF AMSTERDAM, HOLLAND.

METHOD FOR THE EXTRACTION OF THE CAFFEIN OUT OF COFFEE BEANS.

1,414,096. Specification of Letters Patent. Patented Apr. 25, 1922.

No Drawing. Application filed April 22, 1920. Serial No. 375,864.

*To all whom it may concern:*

Be it known that I, HENRY ROSELIUS, a subject of the Queen of the Netherlands, and residing at 55 Damrak, Amsterdam, Holland, have invented certain new and useful Improvements in Methods for the Extraction of the Caffein Out of Coffee Beans, of which the following is a specification.

With the methods, hitherto in use, for the extraction of the caffein out of coffee-beans, it has been possible to extract all but a slight trace of the caffein; however, the most careful treatment has not been successful in preventing with the extraction of the caffein, the loss of other valuable extractable and aromatic matter out of the coffee-beans. Even the most careful use of all methods, known up to the present, causes a loss of weight of at least 1½%, which, in the regular factory-process easily increases to 2 to 3%. Coffee containing on the average only about 27% of extractable matter, the use of the present inefficient working methods causes a loss of from 5 to 10% of the total of extractable and aromatic matter. This loss is especially severe, while the fine aetheric oils, which are the main cause of the aromatic smell of the coffee are extracted in the first place. The diminishing of the aromatic flavour properties of the coffee, caused by the extraction of the caffein, therefore is of great importance for all working methods known up to the present.

A careful examination and a series of experiments in connection with the different working methods have resulted in the discovery, that with every extraction of the caffein out of coffee, the outward appearance of the beans changes to an extent far beyond the change owing to the action of the heat. After the extraction the beans show, in unroasted condition more or less plainly black spots. Some of the beans even turn black all over, getting instead of an even a very uneven coloring, which cannot be explained by the action of the heat, nor by the extraction itself. When these beans are roasted and cut in two, several of them will show changes in their structure. A roasted coffee bean, from which the caffein has not been extracted, shows in section quite filled out, while a bean from which the caffein has been extracted shows hollow spots, the walls of which have an especially spongy appearance. While an ordinary coffee bean keeps a nice, smooth and even appearance after being roasted, the extracted beans show a rough surface, which causes the coffee to look unpalatable and cheap.

Caffein free coffee, after being roasted therefore reminds one very strongly of roasted coffee ruined by fresh or salt water.

The above mentioned examination and experiments therefore lead to the following conclusion:

Probably the 5 to 10% loss of valuable, aromatic matter is not at all caused by the means used for the extraction, but probably apart from the extraction proper, there happens a reaction of water on the beans, which, being very destructible, should be prevented. Further investigation showed the truth of this viewpoint.

The chemical decomposition of the coffee, as is well known, is caused by the reaction of steam or water. The use of water is not to be tolerated, as this causes the fine structure of the bean to tear and the valuable, aromatic matter to be drawn out. Therefore the reaction of steam is generally used in manufacturing processes.

However, up to the present, in none of the well known processes of manufacture measures are taken to successfully prevent the undesired influences of this steam, viz., an excessive condensation to water.

In literature one finds only barely mentioned that for the treatment with dry steam it is desirable to heat the vessel, which contains the beans, outwardly, to prevent condensation; a measure, which is, one might say, unavoidable wherever dry steam is being used, but which in itself is no reason to reach the point of view on which the present invention is based, as the application of new and separate methods for this purpose had not been considered.

As a rule the steam used will be of a temperature of from 100 to 140° C., while the coffee beans, according to the season of the year, will only have a temperature of from 5 to 15° C. The reaction of the hot steam on the cold mass of beans naturally causes an exceedingly strong condensation, which keeps up strongly until the coffee beans have obtained the temperature of the steam. It is especially this extraordinary strong condensation, which causes the destruction of the beans. The separate cells of the beans are temporarily oversaturated with water, which causes them to explode. This explosion of the cellular structure causes the extraction of the valuable, extractable, aromatic matter.

Therefore, before the coffee is "opened" by steam, the unroasted coffee must be heated to the temperature of the steam. When this is done, the coffee can be exposed to the reaction of the steam without any undesired results. The decomposition takes place in about 3 hours. The extraction of the caffein in that case takes place without any destruction of the bean and without any loss of valuable, extractable and aromatic matter. Benzene, trichlorethylene or other caffein solvent may be used as the caffein extracting medium.

As the extraction of the caffein takes place at a temperature, considerably lower than that of the steam,—most of the extraction—means are volatile at a temperature of about 60° C.—the extraction will cause a considerable cooling off of the beans. In the older working methods, steam was turned loose on the coffee, cooled off by the extraction-process, to drive off the extraction-medium. It goes without saying, that again a strong condensation would occur. Even if this latter condensation should be of less importance than that happening by the opening of the pores, it therefore was no less destructable. The extracted coffee being at a temperature of about 60° C. and the added steam at about 120° C. the difference in temperature was sufficient to condense a considerable quantity of water and to allow it to react on the coffee. This of course causes the same undesired effect as that described above for the process of "opening". Therefore to prevent this second destructive influence, it will be necessary, after the extraction of the coffee, to raise the temperature of the beans again approximately to that of the steam. Only after this has been done, the reaction of the steam, to drive off the extraction medium, can take place. A caffein free coffee prepared in accordance with this working process gave a product, which surpassed everything in this line, produced up to the present. This product compares absolutely with the original coffee, as to the amount of extractable matter and aroma; the caffein only is absent.

What I claim is:—

1. A process for removing caffein from raw coffee beans, consisting in heating the beans to a temperature sufficient to prevent condensation of subsequently applied steam, admitting dry steam into contact with said beans, then subjecting the beans to a caffein extracting medium, then reheating the partially cooled beans to a temperature sufficient to prevent condensation of the medium-removing dry steam finally applied.

2. A process for removing caffein from raw coffee beans consisting in heating said beans to a temperature slightly exceeding that of "opening" steam then applied which temperature is generally from 100° C. to 140° C., applying a caffein extracting medium such as benzene then reheating the partially cooled beans to a temperature in excess of that of the medium-removing steam finally admitted into contact with said beans.

In testimony whereof I affix my signature.

HENRY ROSELIUS.

Witnesses:
C. HOURENS, Jr.,
A. W. ANKUGH.